United States Patent [19]

Helfritch

[11] Patent Number: 5,785,932
[45] Date of Patent: Jul. 28, 1998

[54] CATALYTIC REACTOR FOR OXIDIZING MERCURY VAPOR

[75] Inventor: Dennis J. Helfritch, Baltimore, Md.

[73] Assignee: Environmental Elements Corp.

[21] Appl. No.: 604,885

[22] Filed: Feb. 22, 1996

[51] Int. Cl.$^6$ .................................................. B01J 19/12
[52] U.S. Cl. ........................... 422/186.04; 422/186.29; 422/22; 422/907
[58] Field of Search .............................. 422/171, 186.04, 422/186.29, 907, 22

[56] References Cited

U.S. PATENT DOCUMENTS

| | | | |
|---|---|---|---|
| 1,844,420 | 2/1932 | Buttolph | 204/162 |
| 2,905,608 | 9/1959 | Noddings et al. | 204/162 |
| 3,574,076 | 4/1971 | Kirsch | 204/162 |
| 3,675,096 | 7/1972 | Kiess | 317/262 A |
| 4,318,708 | 3/1982 | Högberg | 23/230 R |
| 4,516,991 | 5/1985 | Kawashima | 55/124 |
| 4,729,821 | 3/1988 | Timmons et al. | 204/164 |
| 4,883,570 | 11/1989 | Efthimion et al. | 204/164 |
| 4,960,445 | 10/1990 | Helfritch | 55/5 |
| 4,968,395 | 11/1990 | Pavelle et al. | 204/130 |
| 4,985,219 | 1/1991 | Helfritch et al. | 423/235 |
| 5,174,877 | 12/1992 | Cooper et al. | 204/193 |
| 5,213,780 | 5/1993 | Helfritch | 423/239 |
| 5,236,672 | 8/1993 | Nunez et al. | 422/186.04 |
| 5,240,575 | 8/1993 | Mathua et al. | 204/177 |
| 5,536,477 | 7/1996 | Cha et al. | 422/171 |
| 5,542,967 | 8/1996 | Ponizousky et al. | 96/2 |
| 5,603,893 | 2/1997 | Gundersen et al. | 422/22 |

*Primary Examiner*—Daniel J. Jenkins
*Attorney, Agent, or Firm*—Rosenberg, Klein & Bilker

[57] ABSTRACT

A catalytic reactor (10) for oxidizing elemental mercury contained in flue gas is provided. The catalyst reactor (10) comprises within a flue gas conduit a perforated corona discharge plate (30a, b) having a plurality of through openings (33) and a plurality of projecting corona discharge electrodes (31); a perforated electrode plate (40a, b, c) having a plurality of through openings (43) axially aligned with the through openings (33) of the perforated corona discharge plate (30a, b) displaced from and opposing the tips of the corona discharge electrodes (31); and a catalyst member (60a, b, c, d) overlaying that face of the perforated electrode plate (40a, b, c) opposing the tips of the corona discharge electrodes (31). A uniformly distributed corona discharge plasma (1000) is intermittently generated between the plurality of corona discharge electrode tips (31) and the catalyst member (60a, b, c, d) when a stream of flue gas is passed through the conduit. During those periods when corona discharge (1000) is not being generated, the catalyst molecules of the catalyst member (60a, b, c, d) adsorb mercury vapor contained in the passing flue gas. During those periods when corona discharge (1000) is being generated, ions and active radicals contained in the generated corona discharge plasma (1000) desorb the mercury from the catalyst molecules of the catalyst member (60a, b, c, d), oxidizing the mercury in virtually simultaneous manner. The desorption process regenerates and activates the catalyst member molecules.

27 Claims, 3 Drawing Sheets 5,785,932

1

CATALYTIC REACTOR FOR OXIDIZING MERCURY VAPOR

BACKGROUND OF THE INVENTION

1. Field of the Invention

The subject catalytic reactor for oxidizing mercury vapor relates to reactors for oxidizing pollutants contained in a gas stream. More specifically, the subject catalytic reactor relates to a catalyst-assisted corona discharge reactor for oxidizing elemental mercury molecules contained in a stream of flue gas.

With stringent air toxics standards already in place both at the State and Federal levels, efficient oxidation of pollutants in flue gas for subsequent removal has become and will continue to grow as a matter of high priority in air pollutant control.

The need for efficient, effective mercury vapor control is particularly urgent. As of 1990, no fewer than twenty states had issued health advisories stemming from elevated levels of mercury detected in fish caught for consumption from lakes and rivers. In Michigan, the mercury health advisory extends to each of its 10,000 or so lakes. It was determined that most of the mercury in these lakes resulted from atmospheric deposition—fallout of mercury vapor.

Much of the mercury found in the atmosphere is directly attributable to flue gas emissions from industrial combustion processes. Power plants alone are estimated to account for 20% to 40% of all atmospheric mercury. With anticipated reductions in mercury release from various other sources such as battery and paint products, it is expected that coal combustion in power plants will account for as much as 60% of mercury emissions by the year 2010. The need for efficient, effective mercury vapor control in such combustion processes is quite significant.

Currently, the predominant means for controlling mercury vapor in flue gas is by injecting into and subsequently removing from the flue gas iodine-impregnated carbon powder which adsorbs mercury vapor. This process, however, is notably inefficient, requiring more than 1,000 parts by weight of iodine-impregnated carbon powder to one part by weight of mercury to be removed. A 100 megawatt (MW) plant emitting 20 $\mu m/m^3$ of mercury vapor would then require carbon powder injection at the rate of at least 15 pounds per hour. This would translate, in cost, over a 6,000 operational hour year, to more than $360,000.00 just for the consumed carbon powder alone.

The subject catalytic reactor offers a more efficient means for controlling mercury vapor. It employs a catalyst-assisted process in oxidizing the mercury vapor contained in a passing stream of flue gas by use of a uniformly-distributed corona discharge plasma. Thus oxidized, the condensed mercuric oxide may be captured by a conventional particle collector, such as an electrostatic precipitator.

Corona is a term used to describe the gaseous breakdown which occurs when a gas is sufficiently stressed electrically. Typically, corona is generated by passing a gas stream through an electric field generated between two electrodes having a potential difference applied thereacross. This results, for instance, in the case of negative corona, in the emission from the emitter electrode of energetic electrons which collide with the passing gas molecules to produce a plasma region in which various ions and radicals are formed. This is visible as a stable glow discharge, or corona discharge, the ions and radicals formed therein being available for reaction with various pollutant molecules contained

2 in the passing gas stream. The generation of corona, and its effectiveness in converting pollutant molecules contained in a passing gas stream depend on the gas stream composition, temperature, pressure, and on the electrode geometry employed.

2. Prior Art

Gas treatment systems employing corona discharge to convert the form of constituent molecules of a gas are known. In addition, such systems having the conversion process assisted by a catalyst are also known. The closest known prior art includes U.S. Pat. Nos. #4,729,821; #3,675,096; #5,236,672; and, #4,318,708, which are generally directed to gas reactor systems employing a catalyst composition. Additional prior art known to Applicant includes U.S. Pat. Nos. #4,516,991; #2,905,608; #3,574,076; #5,240,575; #1,844,420; #4,968,395; and, #5,174,877.

None of the systems disclosed in this prior art provides for a corona discharge reactor for oxidizing pollutants contained in a gas stream wherein an oxidation catalyst composition for increasing the rate of oxidation of the pollutants effected by a corona discharge is itself activated by that corona discharge. For instance, U.S. Pat. No. #4,729,821 is directed to a reactor system wherein a gas reaction-enhancing catalyst composition is activated by the direct application of an electric field thereto via electrodes, not via a generated corona discharge. U.S. Pat. No. #3,675,096 is directed to a corona discharge device for use in a gas reactor system wherein a catalytic composition is employed, not to increase the rate of reactions effected by the corona discharge, but to convert the ozone by-product of those reactions to non-toxic form. U.S. Pat. No. #5,236,672 is directed to a gas reactor system wherein corona discharge is employed to decompose volatile organic compounds wherein a catalyst composition is used to improve the efficiency of the system; however, the catalyst composition is not activated by the generated corona discharge. Finally, U.S. Pat. No. #4,318,708 is directed to a method of investigation or control of catalyst reactions wherein the use of a disclosed apparatus in studying the effect of corona current on a catalytic reaction is disclosed. The Patent is not directed to a specific reactor system, nor does it teach activation of a catalyst by a corona discharge whereby the resulting catalytic operation enhances the reactions effected by that corona discharge.

There is, moreover, no prior art known to Applicant teaching a reactor system wherein a corona-activated composition adsorbs pollutants contained in a gas stream to be subsequently re-generated by a corona discharge which desorbs the pollutants therefrom. Consequently, there is no teaching of such a system wherein activation of the catalyst composition and oxidation of the desorbed pollutant molecules occur virtually simultaneously with the desorption process.

SUMMARY OF THE INVENTION

The subject catalytic reactor provides a fluidic flow path through which a stream of flue gas containing mercury vapor passes, effecting the oxidation of the mercury vapor contained therein by intermittently generating in that flow path a spatially distributed corona discharge plasma. It employs a catalyst member in the flow path and proximal to the points of corona discharge generation formed by an oxidation catalyst composition. During those periods without corona discharge generation, the oxidation catalyst composition serves a second function by adsorbing until saturation mercury vapor contained in the passing flue gas stream. During a subsequent period of corona discharge generation, the corona discharge plasma generated desorbs mercury from the catalyst composition and oxidizes the desorbed mercury while activating the catalyst composition to serve its catalytic function for the ongoing process.

The subject catalytic reactor, in the preferred embodiment, employs the pulsed corona generation approach applying high voltage pulses having rise times on the order of 100 nanoseconds or less to a plurality of fine, wire-like discharge electrodes axially aligned with and evenly distributed across the flow path of a passing gas stream. These discharge electrodes are supported on a perforated discharge plate having a plurality of evenly-spaced through openings, between which the discharge electrodes are evenly dispersed. A perforated electrode plate, also having a plurality of evenly-spaced through openings, is placed in the gas stream flow path in close proximity to the free ends of the discharge electrodes supported by the perforated discharge plate with its through openings coaxially aligned with the corresponding through openings of the perforated discharge plate.

At least one catalyst member is included adjacent the perforated electrode plate. The face of the perforated electrode plate opposing the free ends of the discharge electrodes is covered with a porous material coated with an oxidation catalyst composition containing vanadium.

The resulting construction divides the flow path of the passing gas stream into a plurality of parallel flow passages of significantly less volume, while placing in the path of each flow passage corona discharge plasma. This has the two-fold effect of exposing the gas to a spatially uniform corona discharge plasma which promotes thorough contact between the pollutant molecules contained in the gas with the ions and radicals of the corona discharge plasma, and of insuring that the oxidizing reactions between the pollutant molecules and the plasma ions/radicals occur near discharge points where electron energy levels are sufficiently high to fuel those reactions.

The catalyst member not only captures mercury vapor during those periods when corona is not being generated, it also aids the oxidation process during corona generation. It, therefore, significantly enhances the efficiency/effectiveness of mercury vapor control.

DESCRIPTION OF THE PREFERRED EMBODIMENTS

Figure 1:
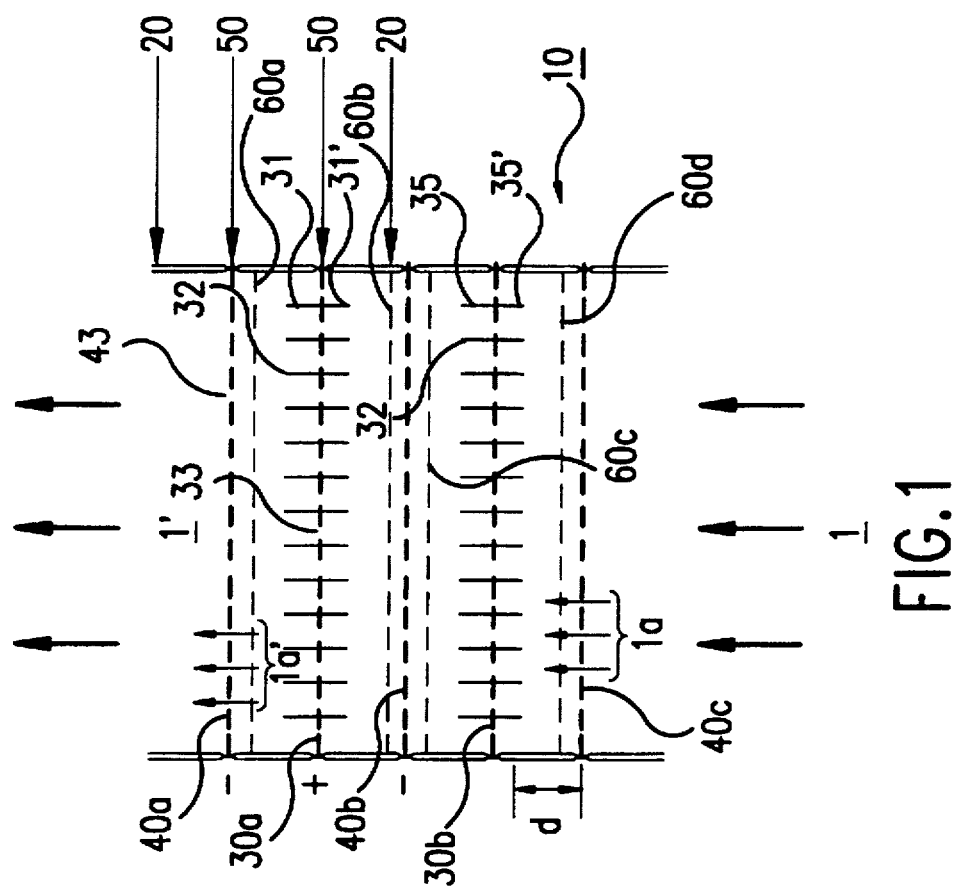
FIG. 1 is a schematic diagram illustrating the cross-sectional layout of the subject catalytic reactor.
Figure 2:
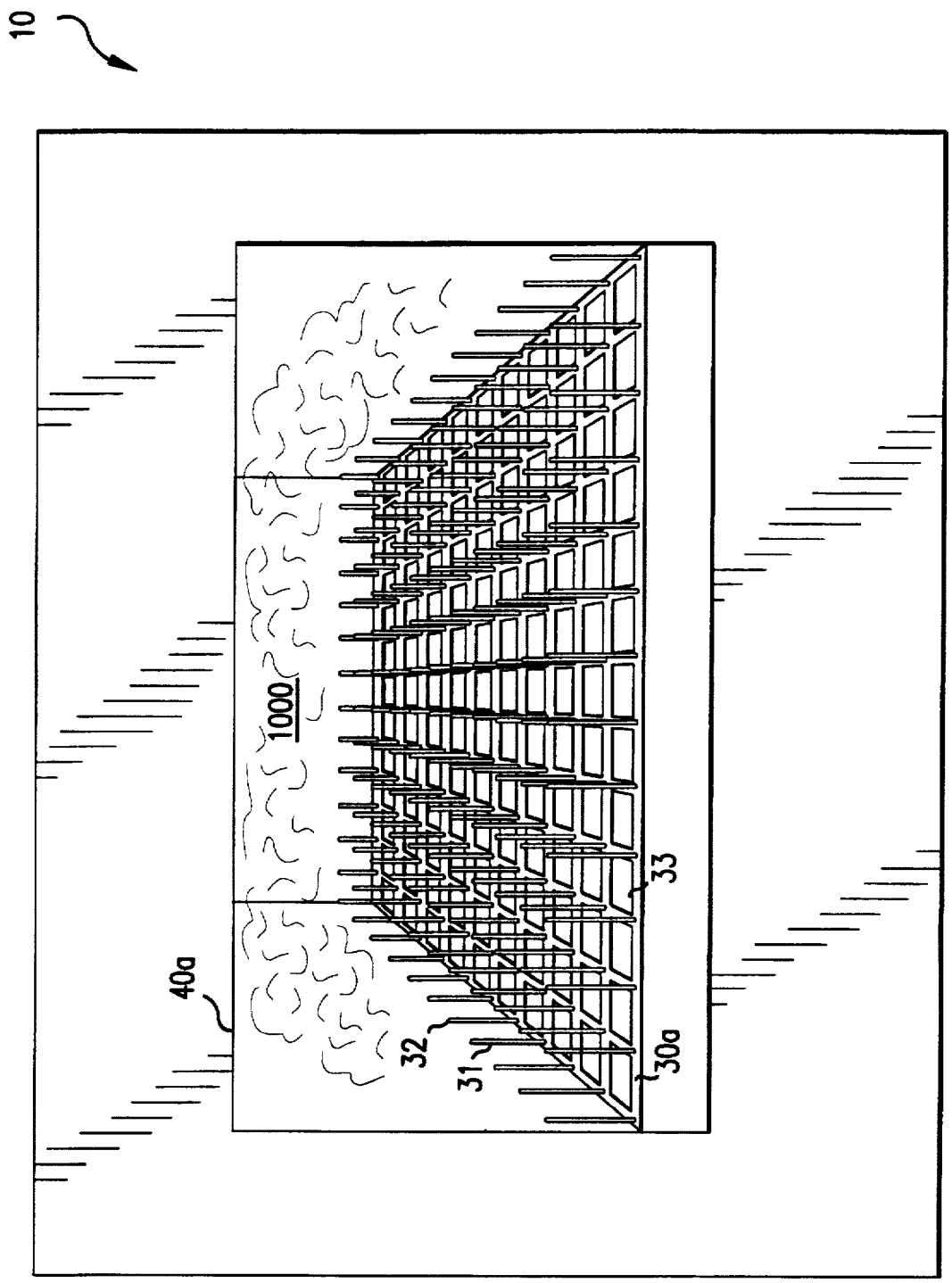
FIG. 2 is a partial perspective view of the subject catalytic reactor; and, FIG. 3 is a schematic diagram illustrating the powering circuit for the subject catalytic reactor.

Referring now to FIG. 1 and FIG. 2, there is shown catalytic reactor 10 for use in a gas stream reactor system, or more specifically, in a flue gas reactor system. The catalytic reactor 10 comprises a plurality of coaxially-stacked dielectric sections 20 of common cross-sectional shape and equal cross-sectional dimensions. Dielectric sections 20 may possess another cross-sectional shape, for instance, a rectangle or square, or have another material composition; however, each dielectric section 20 in the preferred embodiment has a circular cross-sectional shape of uniform diameter and is formed of a glass composition. Dielectric sections 20, when stacked together, thus form generally a cylindrical conduit through which a stream of flue gas flows, as indicated by the inlet and outlet arrows 1 and 1'.

In accordance with the present invention, a perforated discharge plate 30a is captured and supported between two adjoining dielectric sections 20, 20 to extend transaxially across the flow path of the flue gas. Perforated discharge plate 30a has a plurality of through openings 33 formed therein and a plurality of fine, wire-like corona discharge electrodes 31 extending substantially normally from at least one of its two planar surfaces. Corona discharge electrodes 31 are evenly dispersed about plate 30a between through openings 33 as shown. Each corona discharge electrode 31 has a free end, or tip 32, which forms a corona discharge point. Opposing the tips 32 of corona discharge electrodes 31 of corona discharge plate 30a is a perforated electrode plate 40a captured and supported between another pair of adjoining dielectric sections 20, 20. Displaced from the tips 32 of corona discharge electrodes 31 preferably by a distance d of approximately 1", perforated electrode plate 40a has a plurality of through openings 43 coaxially aligned with, and having the same cross-sectional width and dimensions as through openings 33 of perforated discharge plate 30a.

That face of perforated electrode plate 40a opposing perforated discharge plate 30a is overlaid with a catalyst member 60a. Catalyst member 60a is preferably a sheet of fiberglass cloth. The glass fibers of this fiberglass cloth are coated with a catalyst composition containing vanadium, such as a vanadium-titanium composition. Catalyst compositions containing vanadium are strong adsorbers of mercury vapor in the absence of corona discharge. Hence, during the low periods of pulsed corona generation, mercury vapor in the continually flowing flue gas is adsorbed in the catalyst molecules. When corona is subsequently generated, a virtually simultaneous desorption of mercury from the saturated catalyst molecules and oxidation of the desorbed mercury occurs. By this process, the generated corona discharge regenerates the catalyst molecules, actually activating the catalytic operation of those molecules, even at system temperatures well below the optimal temperature at which catalytic operation otherwise occurs.

A portion of each perforated plate 30a and 40a extends radially beyond the sidewalls of dielectric sections 20 to form power connection tabs 50. Silicon gaskets are fitted at the interface of adjoining dielectric sections 20 and a perforated plate 30a, 40a supported therebetween so as to prevent the escape of gas through the interface.

Although in accordance with the present invention, only a singular corona plane forming means—one perforated discharge plate 30a and a set of corona discharge electrodes 31 extending substantially normally from one planar surface of plate 30a—and only one each of perforated electrode plate 40a and catalyst member 60a in close proximity to the corona plane forming means is necessary, the preferred embodiment incorporates two pairs of such means for forming a corona plane, each pair being sandwiched between a pair of catalyst planes 60a, 60b, 60c, and 60d. Each pair of means for forming a corona plane shares a common perforated discharge plate 30a, 30b, each opposing planar face of the plate 30a, 30b having a set of corona discharge electrodes, 31 and 31', 35 and 35'.

Corona discharge electrodes 31, 31', 35, 35'are each preferably ½ inch in length and are soldered to a discharge plate 30a, 30b in rows, each spaced 7/16 inch apart from any other. Each through opening 33, 43 of perforated plates 30a, 30b, 40a, 40b, 40c preferably has a square cross-sectional shape having sides of ⅜ inch length such that a corona discharge electrode 31, 31', 35, 35'is positioned adjacent each corner of a given through opening 33. Through openings 33, 43 of 30a–b and 40a–c are arranged to be substantially aligned with one another along the axial dimension of catalytic reactor 10. With this configuration, when a high voltage power source is connected across the tabs 50, 50 of perforated discharge plates 30a–30b and perforated electrode plates 40a–c, a corona discharge is generated between each corona point 32 and its opposing perforated electrode plate 40a–c, and a spatially-distributed corona discharge plasma 1000 results.

As a stream of flue gas flows into catalytic reactor 10 at inlet 1, perforated electrode plate 40c causes the gas stream to be divided into a plurality of parallel flow passages, as shown by the arrows at 1a and 1a'. The flue gas passing through each flow passage then encounters at each corona plane forming means it passes the corona discharge formed collectively via the four discharge electrodes surrounding a given through opening 33. Consequently, pollutant molecules contained in the flue gas in any given flow passage is as thoroughly exposed to corona discharge as are the pollutant molecules in any other flow passage. Moreover, contact with corona discharge plasma occurs for the pollutant molecules of each flow passage in very close proximity to the points of corona discharge, where electron energy levels are high. Thus, optimum conditions for the occurrence of oxidizing reactions for those pollutant molecules are realized.

Referring now to the powering scheme for generating the corona discharges of catalytic reactor 10, various means for generating corona are known. One such means is pulsed corona generation (pulsed energization) which refers to the application of high-voltage pulses having extremely fast rise times (pulse widths typically are in microseconds; pulse rise times are typically in tens of nanoseconds) to a discharge electrode having high curvature geometry, such as a thin wire or a sharp point. This approach offers several advantages over the other approaches. First, the use of fast, short pulses enable electrode voltages to significantly exceed the DC breakdown voltages of typical DC systems. This results in the emission of higher energy electrons, which in turn yield more efficient conversion of pollutant molecules contained in a passing gas stream. Second, the use of voltage pulses prevents the waste of energy that would otherwise result from the fueling of unnecessary ion movements and gas stream heating caused by sustained high voltage.

Figure 3:
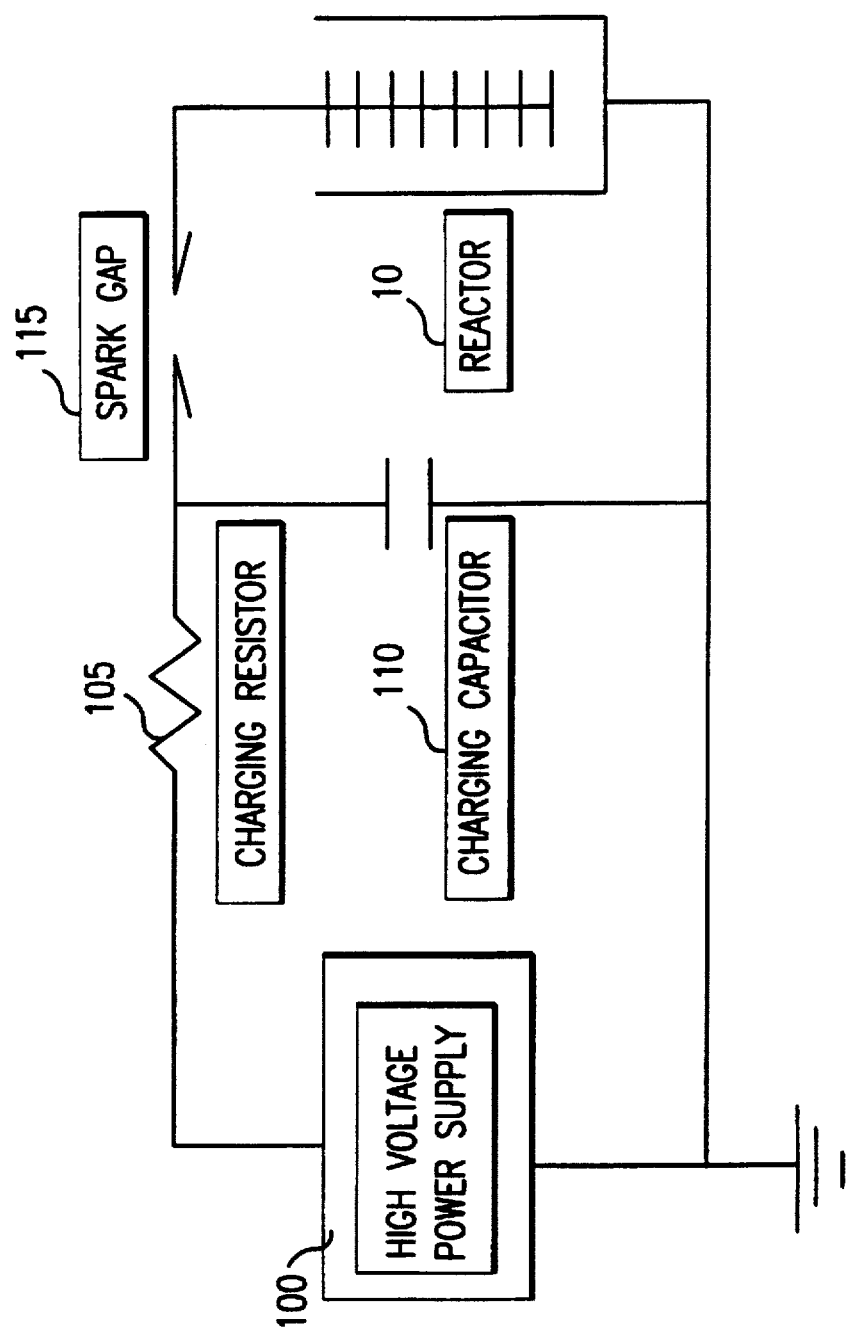

In the preferred embodiment, the pulsed voltage energization approach is employed. Employing pulse voltage energization permits higher voltages to be applied to tabs 50 to realize higher electric fields across each gap between a corona discharge point 32 and its corresponding perforated electrode plate 40a–c, as the short duration of the applied voltage pulses suppresses the formation of sparks across the gap. Preferably, voltage pulses on the order of 27 kilovolts (KV) at a frequency of 400 pulses per second are applied to tabs 50. Such pulses are preferably generated by coupling to the output of a high voltage power supply, such as a 50 KV, 20 mA Hipotronics DC power supply, a pulse generator, such as an Ion physics pulse generator, to form the circuit illustrated in FIG. 3. As there shown, the pulse generator essentially places in series with high voltage power supply 100, a charging resistor 105 and charging capacitor 110. The circuit generates a series of high voltage pulses which prompt corona discharges across the spark gap 115 formed between each corona discharge point 32 and its corresponding perforated electrode plate 40a–40c.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, relative locations of elements may be reversed or interposed, all without departing from the spirit or scope of the invention as defined in the appended claims.

What is claimed is:

1. A catalytic reactor for oxidizing elemental mercury contained in a gas stream by use of corona discharge comprising:

a. an elongate fluidic flow conduit extending in an axial direction for axial passage therethrough of said gas stream, said fluidic flow conduit having an axially-extending sidewall portion formed of a dielectric material;

b. means for forming a corona plane extending transaxially across said fluidic flow conduit, said means for forming said corona plane including a substantially planar perforated discharge plate and a plurality of electrodes electrically connected thereto, said perforated discharge plate having opposing upper and lower surfaces, said perforated discharge plate having a plurality of through openings passing in a direction parallel said axial direction, said electrodes projecting from at least one of said upper and lower surfaces of said perforated discharge plate, each of said electrodes defining a corona point;

c. a substantially planar perforated electrode plate transaxially extending across said fluidic flow conduit and axially displaced from said means for forming said corona plane by a predetermined distance, said perforated electrode plate having a pair of opposing outer surfaces, said perforated electrode plate having a plurality of through openings passing in a direction parallel said axial direction, at least one of said outer surfaces opposing said corona points;

d. a catalyst member overlaying said one of said outer surfaces of said perforated electrode plate opposing said corona points, said catalyst member including a catalyst composition for increasing the rate of said oxidation of said elemental mercury contained in said gas stream, said catalyst composition being substantially activated by said corona discharge; and, e. means for generating a predetermined electric potential difference between said means for forming said corona plane and said perforated electrode plate for producing said corona discharge between said corona points and said perforated electrode plate during passage of said gas stream through said fluidic flow conduit.

2. The catalytic reactor for oxidizing elemental mercury contained in a gas stream as recited in claim 1 wherein said means for generating a predetermined electric potential difference generates said potential difference intermittently.

3. The catalytic reactor for oxidizing elemental mercury contained in a gas stream as recited in claim 2 wherein said catalyst composition adsorbs said elemental mercury from said gas stream in the absence of said corona discharge in said fluidic flow conduit.

4. The catalytic reactor for oxidizing elemental mercury contained in a gas stream as recited in claim 3 wherein said generated corona discharge desorbs and oxidizes, in substantially simultaneous manner, said elemental mercury adsorbed in said catalyst composition.

5. The catalytic reactor for oxidizing elemental mercury contained in a gas stream as recited in claim 4 wherein said catalyst composition contains vanadium.

6. The catalytic reactor for oxidizing elemental mercury contained in a gas stream as recited in claim 5 wherein said catalyst composition contains titanium.

7. The catalytic reactor for oxidizing elemental mercury contained in a gas stream as recited in claim 5 wherein said catalyst member comprises a fibrous material overlaying at least a portion of said perforated electrode plate, said catalyst composition being coated onto said fibrous material.

8. The catalytic reactor for oxidizing elemental mercury contained in a gas stream as recited in claim 7 wherein said fibrous material has a plurality of glass fibers impregnated therein, said catalyst composition being coated onto said glass fibers.

9. The catalytic reactor for oxidizing elemental mercury contained in a gas stream as recited in claim 8 wherein said reactor includes four of said means for forming said corona plane, three of said perforated electrode plates, and four of said catalyst members.

10. The catalytic reactor for oxidizing elemental mercury contained in a gas stream as recited in claim 9 wherein each of said corona points is displaced from said catalyst member opposed thereto by approximately one inch in said axial direction.

11. The catalytic reactor for oxidizing elemental mercury contained in a gas stream as recited in claim 10 wherein said electrodes are spaced apart one from the other by approximately 7/16 inch, each of said electrodes being approximately 1/2 inch in length, each of said through openings of said perforated discharge plate having a substantially square cross-sectional shape formed by sides having a length of approximately 1/8 inch.

12. The catalytic reactor for oxidizing elemental mercury contained in a gas stream as recited in claim 8 wherein said fibrous material of said catalyst member has a weave weight of approximately 14 oz./yd$^2$.

13. The catalytic reactor for oxidizing elemental mercury contained in a gas stream as recited in claim 8 wherein each of said perforated discharge and perforated electrode plates is formed of a steel composition.

14. The catalytic reactor for oxidizing elemental mercury contained in a gas stream as recited in claim 9 wherein said fluidic flow conduit has a substantially cylindrical contour, and wherein said sidewall portion of said fluidic flow conduit is formed by a plurality of coaxially stacked cylindrical glass sections, said means for forming said corona planes and said perforated electrode plates overlaid with one of said catalyst members, each being supported between adjacent ones of said cylindrical glass sections.

15. A method for oxidizing elemental mercury contained in a gas stream by use of corona discharge comprising the steps of:
   a. passing a stream of said gas stream through a fluidic flow path along a fluidic flow direction defined thereby;
   b. providing in said fluidic flow path a catalyst composition, whereby regeneration thereof by said corona discharge increases the rate of said oxidation of said elemental mercury contained in said gas stream, said catalyst composition having associated therewith an optimal catalytic operation temperature; and,
   c. generating in said fluidic flow path said corona discharge for providing said oxidation by chemically reacting with said elemental mercury to form mercuric oxide and for providing said regeneration of said catalyst composition, whereby said catalyst composition may be activated notwithstanding a temperature in said fluidic flow path less than said optimal catalytic operation temperature.

16. The method for oxidizing elemental mercury contained in a gas stream as recited in claim 15 wherein said corona discharge is intermittently generated in said fluidic flow path.

17. The method for oxidizing elemental mercury contained in a gas stream as recited in claim 16 wherein said catalyst composition includes vanadium.

18. The method for oxidizing elemental mercury contained in a gas stream as recited in claim 17 wherein said catalyst composition adsorbs said elemental mercury from said gas stream in the absence of said corona discharge in said fluidic flow path.

19. The method for oxidizing elemental mercury contained in a gas stream as recited in claim 18 wherein said corona discharge generated in said fluidic flow path desorbs and oxidizes, in substantially simultaneous manner, said elemental mercury from said catalyst composition.

20. The method for oxidizing elemental mercury contained in a gas stream as recited in claim 17 wherein said catalyst composition includes titanium.

21. A catalytic reactor for oxidizing elemental mercury contained in a gas stream by use of a corona discharge comprising:
   a. a fluidic flow conduit for passage therethrough of said gas stream;
   b. first and second corona plane members captured within said fluidic flow conduit, said first and second corona plane members being displaced by a predetermined distance one from the other;
   c. means for generating a potential difference between said first and second corona plane members for generating said corona discharge therebetween during passage of said gas stream through said fluidic flow conduit; and,
   d. a catalyst member overlaying at least a portion of said second corona plane member, said catalyst member including a catalyst composition for increasing the rate of said oxidation of said elemental mercury contained in said gas stream, said catalyst composition being substantially activated by said corona discharge.

22. The catalytic reactor for oxidizing elemental mercury contained in a gas stream as recited in claim 21 wherein said means for generating a potential difference between said first and second corona plane members generates said potential difference intermittently.

23. The catalytic reactor for oxidizing elemental mercury contained in a gas stream as recited in claim 22 wherein said catalyst composition adsorbs said elemental mercury from said gas stream in the absence of said corona discharge in said fluidic flow conduit.

24. The catalytic reactor for oxidizing elemental mercury contained in a gas stream as recited in claim 23 wherein said generated corona discharge desorbs and oxidizes, in substantially simultaneous manner, said elemental mercury adsorbed in said catalyst composition.

25. The catalytic reactor for oxidizing elemental mercury contained in a gas stream as recited in claim 24 wherein said catalyst composition contains vanadium.

26. The catalytic reactor for oxidizing elemental mercury contained in a gas stream as recited in claim 25 wherein said catalyst composition contains titanium.

27. The catalytic reactor for oxidizing elemental mercury contained in a gas stream as recited in claim 25 wherein said catalyst member comprises a fibrous material overlaying a portion of said second corona plane member, said catalyst composition being coated onto said fibrous material.

\* \* \* \* \*